UNITED STATES PATENT OFFICE.

WILLIAM E. CARSON, OF RIVERTON, VIRGINIA.

CEMENTITIOUS PRODUCT AND PROCESS OF MAKING SAME.

1,094,876. Specification of Letters Patent. Patented Apr. 28, 1914.

No Drawing. Application filed April 5, 1911, Serial No. 619,133. Renewed October 25, 1913. Serial No. 797,356.

*To all whom it may concern:*

Be it known that I, WILLIAM E. CARSON, a citizen of the United States, residing at Riverton, in the county of Warren and State of Virginia, have invented certain new and useful Improvements in Cementitious Products and Processes of Making Same, of which the following is a specification.

This invention relates to cementitious products and processes of making same; and it comprises as a new composition of matter, a cementitious composition comprising a composition of fine ground high alumina slag and fine ground lime, said composition being hydrated short of the setting point and said composition being unfused and unsintered but having a chemical union existing between its components; and it further comprises a process of making such a composition wherein quicklime and a high alumina slag are fine ground together and the pulverulent mixture is treated with sufficient water to cause a hydration and chemical action but insufficient to cause the mixture to set by the formation of the chemical compounds of set cement; all as more fully hereinafter set forth and as claimed.

In cementitious compositions, the presence of aluminate of calcium is highly desirable as it causes a quick set. There are many iron ores which contain as gangue or impurity more or less bauxite and kaolinite, causing the slag produced in the reduction of such ores to be high in alumina. Such slag is often converted into cement or cementitious bodies by fusing, sintering or clinkering with lime to produce a clinker which, when fine ground, may be admixed with lime to give quick setting compositions. This however requires regular cement making apparatus and is furthermore laborious and expensive as producing the final composition sought in a plurality of stages: first, fine grinding of the slag and its admixture with limestone. clinkering the mixture, regrinding the clinker, finally mixing with hydrated lime and setting. When the mixture is treated with water, or "gaged," the aluminate, which is usually of an "acid" nature, the amount of alumina present being greater than corresponds to the lime and the hydrated lime react with the water to form "set" compounds. As however the setting of an aluminate is relatively quick while the fine-ground clinkered aluminate is of rather a sandy nature and is but slowly attacked by water, the setting is apt to outstrip the utilization of the clinkered aluminate and there is a residue of such aluminate which functions mainly as sand.

I have found that compositions of more desirable character can be more economically made by omitting the furnacing and clinkering operation altogether and employing a hydration process in which the temperatures are relatively low as compared with those incident to clinkering. If the slag be fine ground, which would be necessary in any event in making the clinker, this fine ground material then intimately mixed with fine ground quicklime and the mixture hydrated just short of the setting point giving intermediate hydration products, a composition may be produced which is directly useful as a cementitious material; or which may be used as an addition to lime or cement. If preferred, the slag and lime may be first mixed and then ground together. But the fine-ground slag and the quicklime should be in contact at the time of the addition of water or steam. After lime is once hydrated though in the presence of sufficient water it will still react with aluminous materials to produce the setting compounds of set aluminates yet it does not readily react to produce the intermediate hydrated unset compounds desired in the present invention. But where the slag and the quicklime are simultaneously presented to the water in a fine-ground intimately mixed state such intermediate compounds are readily formed. And the mixture if hydrated just short of the setting point on further additions of water will give a good and uniform production of the setting compounds.

In the present invention I preferably take a high alumina slag, mix it with the desired amount of quicklime and fine grind the mixture so as, for example, to pass a 50 to 100 mesh sieve. A slag of suitable character may be obtained from iron furnaces treating Cuban or other ores which carry more or less bauxite. Slags from ores having a kaolinite gangue are also well adapted to my purposes. The slag may be preliminarily granulated with water if desired. This lessens the cost of comminution but gives a more or less hydrated material. It is desirable that the slag be not moist or wet at the time of admixture with the quicklime.

The results are markedly different when slag of any character, and particularly high alumina slag, is presented to lime which has been previously hydrated, and when, on the other hand, such slag is first admixed with quicklime and then the water added. When lime has once been hydrated it has, comparatively, little tendency to attack slag and similar material, while if the presentation of the water and the slag to the lime be simultaneous there is much more reaction taking place, and a better article, for the present purposes, is obtained. In the present process, the lime hydrate is presented to the high alumina slag practically in nascent condition, and is therefore necessarily in a much more active form than pre-hydrated lime. Consequently the formation of the calcium aluminates and intermediate compounds occurs with comparative ease. The silica of the slag behaves in much the same way as the alumina.

In practice I find that it is desirable to obtain a final product which is more or less basic in character; that is a product in which the ratio of lime to alumina is rather greater than that in normal calcium aluminate where three molecules of lime are present for each molecule of alumina. For example, I may use a fine ground high alumina slag containing say 35 per cent. $Al_2O_3$. With this slag I mix such a quantity of fine ground quicklime as is necessary to produce a final basic product of the character above described, and then treat the mixture with a limited amount of moisture either in the form of water or steam to accomplish an incomplete cohydration of the materials. Using the materials above mentioned, I find it advantageous to adjust the relative proportions of lime and slag in such a manner that the dry mix contains, say, about 10 per cent. of alumina, the remainder consisting of the accompanying constituents of the slag together with the added lime. This proportion of alumina may be varied considerably, the above figure being merely illustrative. In the hydrating step, the amount of water or steam added is carefully limited and controlled so that the hydration may not proceed quite to the setting point. The object is to produce a chemical union between the lime, the water and the alumina and other components of the slag, producing the stated intermediate compounds which with more water will readily produce the final set compounds but which are not the same as said set compounds. By so regulating and controlling the hydration, the product obtained is comparatively soft and friable and is easily ground to a fine powder, which upon further addition of water sets rapidly to a hard coherent mass. By the addition of suitable controlling materials such as gypsum, the speed of setting may be retarded as desired; or in lieu of adding gypsum directly, a small percentage of sulfuric acid may be added to the water employed in the cohydration of the lime and slag, the gypsum being thus formed within the mass of materials and being thoroughly and molecularly mixed therewith.

The product obtained according to the present process differs materially from cementitious products obtainable by furnacing mixtures of lime and slag. In the latter case sintered or clinkered masses result, containing calcium aluminates of various kinds, but these aluminates are by reason of their method of formation necessarily anhydrous or substantially so. Furthermore, such aluminates are probably of a more stable nature than the hydrated resulting compounds from the low temperature hydration of the present process, and are less active as set-inducing agents. Physically also there are marked differences between clinkered or sintered lime-slag compositions and the present product. The clinkered product resulting from fusion or incipient fusion of the material treated is more dense than the hydrated product, and is considerably harder and more difficult to grind. In grinding it gives particles of a sandy nature. In hydrating lime, subdivision of the material occurs to a degree unattainable by any grinding process; so that in the present process the resulting calcium aluminates are formed and persist in a state of extreme subdivision, while any agglomerated masses of the product are soft and friable and are easily reduced to a fine powder. This of course renders possible a very uniform mixing with the usual filling materials such as lime, sand, etc. Moreover, for reasons previously stated, the somewhat looser combination existing between the constituents in the hydrated calcium aluminates tends to render the bodies here produced more efficient accelerants for lime and cement than are the anhydrous compounds produced by furnace processes, and particularly where such products are acid in their nature.

The cementitious material prepared according to the present process may be mixed with water to give a quick setting hard plaster; or more lime may be added to it if desired either before or after mixing with water. Employed with sand, lime or any other fillers or ingredients commonly used in mortar, the new composition gives mortars of excellent quality. Limited additions to cement give plastics of highly desirable characteristics for many purposes. Many argillaceous and siliceous materials having in themselves no cementitious properties, produce, when mixed with suitable proportions of my new product, valuable hydraulic compositions.

For carrying out the process of the present invention, any suitable mixing apparatus may be employed in which efficient intermingling of the raw materials may be obtained. The proper proportions of lime and slag may be ground together in a chaser, or the ingredients may be separately ground and then mixed afterward as may be most convenient. The hydration is conveniently accomplished in a rotating cylinder provided with internal lateral mixing fins, and having means for controlled admission of water or steam.

What I claim is:—

1. The process of making cementitious compositions which comprises exposing an intermediate mixture of fine ground slag and fine ground quicklime to the action of sufficient water to produce an unset mixture having hydraulic properties.

2. The process of making cementitious compositions which comprises exposing intimately admixed fine ground high alumina slag and quicklime simultaneously to the action of water in amount only sufficient to produce unset compounds.

3. The process of making cementitious compositions which comprises fine grinding slag and quicklime together to produce an intimate commixture and adding water in amount sufficient to hydrate the mixture to a point short of the setting point.

4. The process of making cementitious compositions which comprises fine grinding high alumina slag and quicklime together to produce an intimate commixture and adding water in amount sufficient to hydrate the mixture to a point just short of the setting point.

5. As a new composition of matter, a dry pulverulent mixture comprising a partially hydrated and unset intimate commixture of pulverulent high alumina slag and pulverulent lime, the slag particles having been uniformly chemically affected by said lime with the formation of settable compounds, and said mixture being capable of setting on addition of water.

In testimony whereof, I affix my signature in the presence of witnesses.

WILLIAM E. CARSON.

Witnesses:
 Jos. W. Carson,
 Claude A. Stokes.

It is hereby certified that in Letters Patent No. 1,094,876, granted April 28, 1914, upon the application of William E. Carson, of Riverton, Virginia, for an improvement in "Cementitious Products and Processes of Making Same," an error appears in the printed specification requiring correction as follows: Page 3, line 21, for the word "intermediate" read *intimate;* and that the said Letters Patent should be read with this correction therein that the same may conform to the record of the case in the Patent Office.

Signed and sealed this 12th day of May, A. D., 1914.

[SEAL.]

J. T. NEWTON,

*Acting Commissioner of Patents.*